(12) United States Patent
Li

(10) Patent No.: US 10,843,314 B2
(45) Date of Patent: Nov. 24, 2020

(54) POWER TOOL

(71) Applicant: Nanjing Chervon Industry Co., Ltd., Nanjing (CN)

(72) Inventor: Chunrui Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 357 days.

(21) Appl. No.: 15/955,885

(22) Filed: Apr. 18, 2018

(65) Prior Publication Data

US 2018/0318988 A1 Nov. 8, 2018

(30) Foreign Application Priority Data

May 5, 2017 (CN) .................... 2017 2 0504044 U

(51) Int. Cl.
*B25B 21/00* (2006.01)
*B25F 5/00* (2006.01)
*B25F 5/02* (2006.01)
*B23B 45/00* (2006.01)
*B23B 45/02* (2006.01)
*B25F 3/00* (2006.01)
*B24B 23/02* (2006.01)

(52) U.S. Cl.
CPC .......... *B25B 21/008* (2013.01); *B23B 45/008* (2013.01); *B23B 45/02* (2013.01); *B25B 21/00* (2013.01); *B25F 3/00* (2013.01); *B25F 5/001* (2013.01); *B25F 5/02* (2013.01); *B23B 2260/11* (2013.01); *B24B 23/028* (2013.01); *B25F 5/026* (2013.01)

(58) Field of Classification Search
CPC .. B23B 21/008; B23B 45/008; B23B 2260/11
USPC ........................................... 173/216
See application file for complete search history.

(56) References Cited

U.S. PATENT DOCUMENTS

| 2001/0008186 A1* | 7/2001 | Frauhammer | ........ B25D 17/088 173/90 |
| 2011/0036605 A1* | 2/2011 | Leong | ..................... B25B 21/00 173/47 |
| 2014/0274548 A1* | 9/2014 | Kelleher | ................... F16D 7/00 475/293 |

* cited by examiner

*Primary Examiner* — Chelsea E Stinson
(74) *Attorney, Agent, or Firm* — Greenberg Traurig, LLP

(57) ABSTRACT

A power tool includes a motor, an output shaft and a gearbox assembly. The output shaft outputs torque when driven by the motor to rotate around a first axis. The gearbox assembly transmits power between the motor and the output shaft. The gearbox assembly includes a first case and a second case. The first case and the second case are configured to be coupled to each other to form an accommodating cavity. The gearbox assembly further includes a ring gear, a planet gear, a sun gear, and a front ring gear. The ring gear is rotatably disposed in the accommodating cavity. The planet gear is engaged with the ring gear. The sun gear is engaged with the planet gear.

16 Claims, 7 Drawing Sheets

POWER TOOL

CROSS-REFERENCES TO RELATED APPLICATIONS

This application claims priority to Chinese patent application No. CN201720504044.7, filed on May 5, 2017, the disclosure of which is incorporated herein by reference in its entirety.

TECHNICAL FIELD

The present disclosure relates to a power tool and, in particular, to a power tool with a gearbox assembly.

BACKGROUND

A power tool such as a screwdriver, an electric drill, or an electric hammer typically includes a housing, a motor, an output shaft and a gearbox assembly. The gearbox assembly includes a box and a multistage planetary gear train disposed in the box. Currently, the box is typically formed from aluminum. The planetary gear train typically includes a ring gear whose axial position needs to be limited. At present, the position of the ring gear is typically limited by a step structure disposed on the box. However, deformation of the box may be easily caused by long-term use, thus causing gear skipping during gear shifting.

SUMMARY

A power tool includes a motor, an output shaft and a gearbox assembly. The output shaft is configured to output torque when driven by the motor to rotate around a first axis. The gearbox assembly is configured to transmit power between the motor and the output shaft. The gearbox assembly includes a first case and a second case. The first case and the second case are configured to be coupled to each other to form an accommodating cavity. The gearbox assembly further includes a ring gear, a planet gear, a sun gear, and a front ring gear. The ring gear is provided with internal teeth and is rotatably disposed in the accommodating cavity. The planet gear is engaged with the ring gear. The sun gear is engaged with the planet gear. The front ring gear is disposed in an axial direction and on a side of the ring gear near the output shaft. The first case is formed from a first material. The gearbox assembly further includes a limiting member formed from a second material different from the first material. The limiting member is provided with a locking portion for locking a rotation of the ring gear in a circumferential direction. The limiting member is undetachably connected to the first case.

Further, the ring gear may be axially, movably disposed in the accommodating cavity.

Further, the limiting member may be provided with a limiting portion for limiting an axial position of the front ring gear, the limiting portion may include a limiting surface extending in a plane perpendicular to the first axis, and the gearbox assembly may further includes a spacer disposed between the limiting surface and the front ring gear.

Further, the first case may include a first connecting portion provided with a first connecting hole extending in a direction parallel to the first axis, the second case may include a second connecting portion provided with a second connecting hole extending in the direction parallel to the first axis, and the gearbox assembly may further include a connecting member passing through the first connecting hole and extending into the second connecting hole. At least a part of the limiting member may be disposed between the first connecting portion and the second connecting portion to space apart the first connecting portion and the second connecting portion.

Further, the limiting member may be provided with a communicating hole communicating with both the first connecting hole and the second connecting hole, and the connecting member may pass through the communicating hole.

Alternatively, the limiting member may include a ring portion and an extension portion. An inner ring of the ring portion may be provided with a locking portion for locking a rotation of the ring gear in a circumferential direction. The extension portion may extend from the ring portion outwards in a radial direction perpendicular to the first axis. The extension portion may be further provided with a recess opening towards the first case in a direction parallel to the first axis, and the first case may be provided with a protrusion configured to be embedded in the recess.

Further, the first case may include a first connecting portion provided with a first connecting hole extending in the direction parallel to the first axis, the second case may include a second connecting portion provided with a second connecting hole extending in the direction parallel to the first axis, and the gearbox assembly may further include a connecting member passing through the first connecting hole and extending into the second connecting hole. At least a part of the extension portion may extend between the first connecting portion and the second connecting portion to space apart the first connecting portion and the second connecting portion in the axial direction, and the extension portion may be provided with a communicating hole communicating with both the first connecting hole and the second connecting hole.

Further, the second material may have a greater hardness than the first material.

Further, the front ring gear may be rotatably disposed in the accommodating cavity. The power tool may further include a torque adjustment assembly configured to limit the rotation of the front ring gear in a circumferential direction when a load of the power tool is less than a preset value.

Further, the power tool may further include a clamping device configured to clamp a drilling. The clamping device may be mounted to the output shaft.

Another power tool includes a motor, an output shaft and a gearbox assembly. The output shaft is configured to output torque when driven by the motor to rotate around a first axis. The gearbox assembly is configured to transmit power between the motor and the output shaft. The gearbox assembly includes a first case and a second case. The first case and the second case are configured to be coupled to each other to form an accommodating cavity. The gearbox assembly further includes a ring gear, a planet gear, a sun gear, and a front ring gear. The ring gear is provided with internal teeth and is rotatably disposed in the accommodating cavity. The planet gear is engaged with the ring gear. The sun gear is engaged with the planet gear. The front ring gear is disposed in an axial direction and on a side of the ring gear near the output shaft. The first case is formed from a first material. The gearbox assembly further includes a limiting member formed from a second material different from the first material. The limiting member is provided with a locking portion for locking a rotation of the ring gear in a circumferential direction. The limiting member and the first case are combined into one piece by die-casting.

The present disclosure is beneficial in that a limiting member, undetachably connected to the first case and made from a different material, is provided to limit the position of the front ring gear, thereby effectively preventing the gear skipping due to moving of the front ring gear in an axial direction and improving stability.

DETAILED DESCRIPTION

Figure 1:
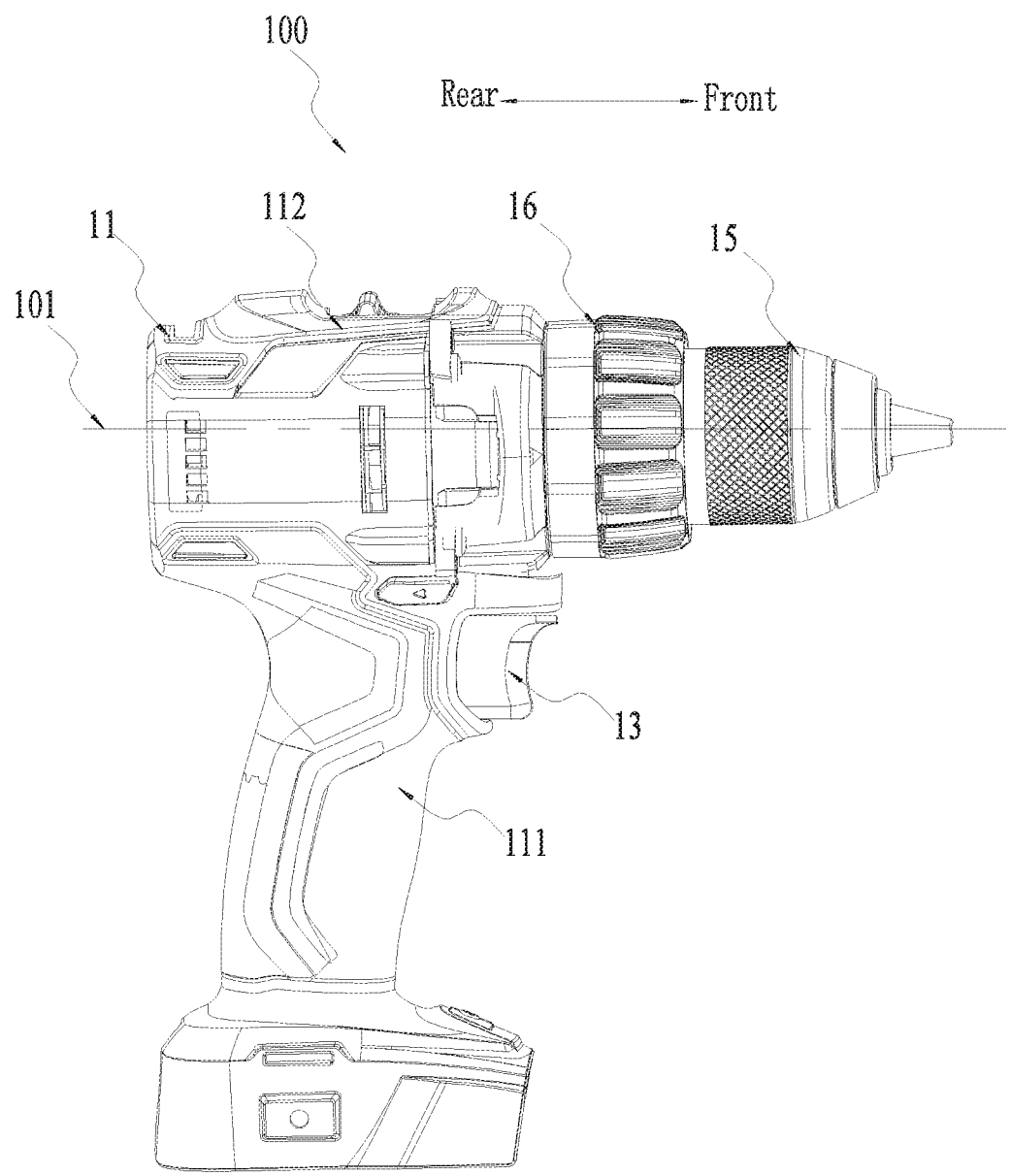
FIG. 1 is a plan view of an exemplary power tool.
Figure 2:
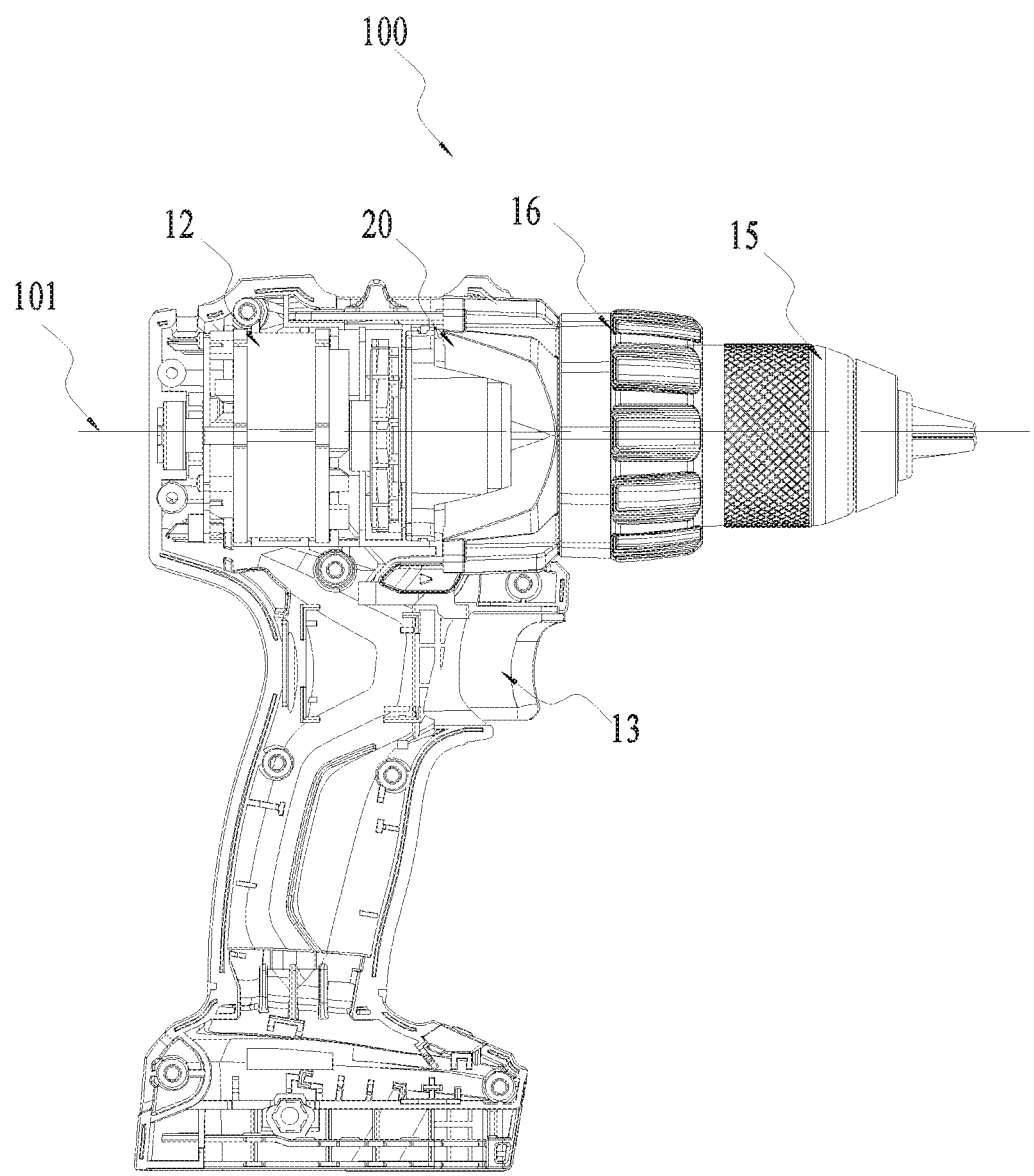
FIG. 2 is a partial interior view of the power tool of FIG. 1 after a part of a housing has been removed.

A power tool 100, illustrated by way of example only in FIGS. 1 and 2, includes a housing 11, a motor 12, a gearbox assembly 20, and a switch 13.

Figure 3:
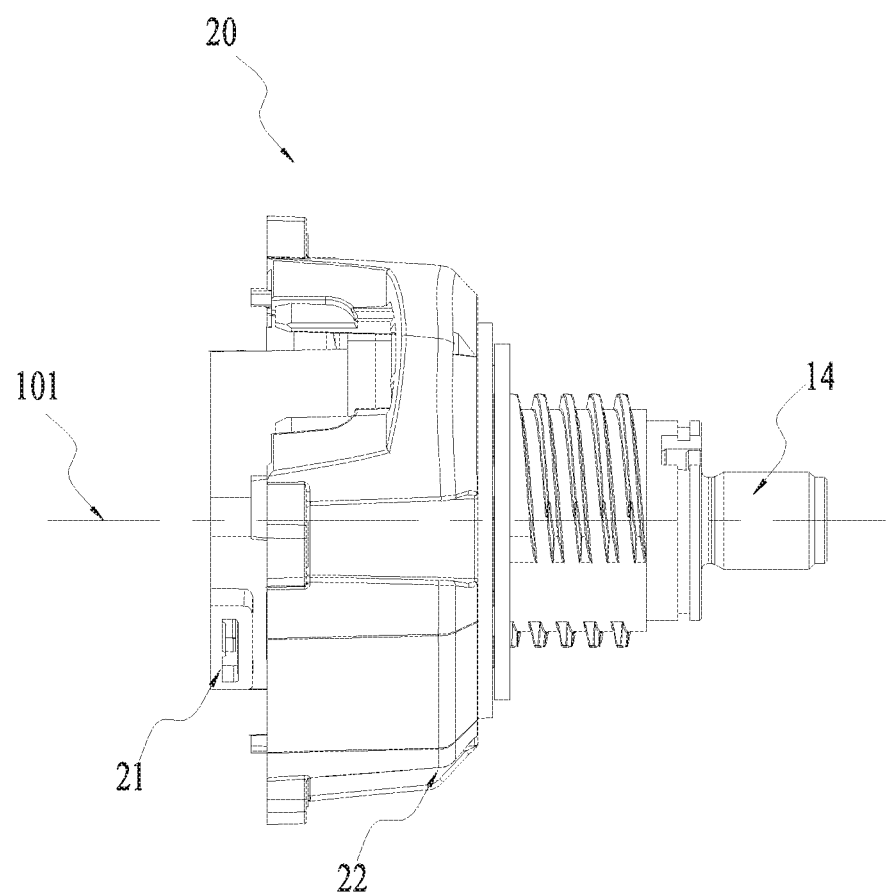
FIG. 3 is a plan view of a gearbox assembly of FIG. 2.

As illustrated in FIGS. 1 and 3, the power tool 100 further includes an output shaft 14.

For ease of description, the power tool 100 is described using an electric drill as an example. Of course, the power tool 100 may be other power tools, such as a screwdriver, or a versatile tool having functions of the screwdriver and the electric drill. Alternatively, the power tool 100 may be a tool that can convert the outputted torque into another form of motion. The power tool, for example a sander or an angle grinder, may be used to polish a workpiece. Such tool, for example a reciprocating saw, a circular saw or a jig saw, may be used to cut a workpiece. Such tool may be used for striking, such as an electric hammer. Such tool may be a garden tool, such as a pruner or a chain saw. Such tool may be used for other purposes, such as an agitator.

As long as provided with the gearbox assembly 20 that is disposed between the motor 12 and the output shaft 14, such tool may adopt in substance the solutions disclosed below.

As illustrated in FIGS. 1 and 2, the housing 11 is used for accommodating various components of the power tool 100, and the housing 11 may include a handle portion 111 and an accommodating portion 112. The handle portion 111 is for a user to hold. The accommodating portion 112 forms an accommodating space for accommodating various components. The switch 13 may be disposed on the handle portion 111. When holding the handle portion 111, the user can easily trigger the switch 13. The switch 13 may be configured as a main trigger for starting the power tool 100. In the case where the power tool 100 is an electric drill, the electric drill may further include a clamping device 15 and a torque adjustment assembly 16. The clamping device 15 is configured to clamp a tool accessory like a drilling bit or a screw bit to the power tool 100. Power can be outputted to the tool accessory via the clamping device 15 to implement the tool function of the power tool 100. The torque adjustment assembly 16 is configured to adjust outputted torque of the output shaft 14 so that the torque of the power tool 100 is adjusted.

The motor 12 is configured to drive the output shaft 14 to rotate around a first axis 101. The motor 12 is disposed in the housing 11. The motor 12 of the electric drill may be an electric motor.

The gearbox assembly 20 is disposed between the motor 12 and the clamping device 15. The gearbox assembly 20 is configured to transmit power between the motor 12 and the output shaft 14.

The output shaft 14 is configured to output torque. The output shaft 14 can rotate around the first axis 101 when driven by the motor 12.

For ease of description of the solutions, the following definitions are made. A direction of the first axis 101 and a direction parallel to the first axis 101 are defined as an axial direction, a direction of a circumference with the first axis 101 as a central axis is defined as a circumferential direction, a direction of a radius of the circumference with the first axis 101 as the central axis is defined as a radial direction, a direction from the motor 12 towards the output shaft 14 along the first axis 101 is defined as a front, and a direction opposite to the front is defined as a rear.

As illustrated in FIGS. 2 to 5, the gearbox assembly 20 includes a first case 21, a second case 22, a planetary gear train 23, a rear planetary gear train 24 and a front planetary gear train 25.

An accommodating cavity 26 is enclosed by the first case 21 and the second case 22 when the first case 21 and the second case 22 are coupled to each other. The planetary gear train 23, the rear planetary gear train 24 and the front planetary gear train 25 are disposed in the accommodating cavity 26.

The planetary gear train 23 includes a ring gear 231, a planet gear 232, a sun gear 233, and a planet carrier 234. The ring gear 231 is provided with internal teeth, rotatable around the first axis 101 and disposed in the accommodating cavity 26. Multiple planet gears 232 are disposed in the ring gear 231 and are engaged with the ring gear 231. The sun gear 233 is disposed among the multiple planet gears 232 and is engaged with the multiple planet gears 232. The multiple planet gears 232 are rotatably mounted on the planet carrier 234 by pins.

The rear planetary gear train 24 is disposed on the rear side of the planetary gear train 23 while the front planetary gear train 25 is disposed on the front side of the planetary gear train 23. That is, the rear planetary gear train 24 is disposed on the side of the planetary gear train 23 near the motor 12 while the front planetary gear train 25 is disposed on the side of the planetary gear train 23 near the output shaft 14. Specifically, the rear planetary gear train 24 includes a rear ring gear 241, a rear planet gear 242, a rear sun gear 243 and a rear planet carrier 244. The rear ring gear 241 is rotatably disposed in the accommodating cavity 26. Multiple rear planet gears 242 are disposed in the rear ring gear 241 and are engaged with the rear ring gear 241. The rear sun gear 243 is disposed among the multiple rear planet gears 242 and is engaged with the multiple rear planet gears 242. The multiple rear planet gears 242 are rotatably mounted on the rear planet carrier 244 by pins. The sun gear 233 is formed by a part of the rear planet carrier 244. The front planetary gear train 25 includes a front ring gear 251, a front planet gear 252, a front sun gear 253 and a front planet carrier 254. The front ring gear 251 is rotatably disposed in the accommodating cavity 26. Multiple front planet gears 252 are disposed in the front ring gear 252 and are engaged with the front ring gear 251. The front sun gear 253 is disposed among the multiple front planet gears 252 and is engaged with the multiple front planet gears 252. The multiple front planet gears 252 are rotatably mounted on the front planet carrier 254 by pins. The front sun gear 253 is formed by a part of the front planet carrier 234. In this way, the configuration of the multilevel planetary gear train plays a role of deceleration.

In addition, the above torque adjustment assembly 16 can also limit the rotation of the front ring gear 251 in the circumferential direction when the load of the power tool 100 is less than a preset value while release the rotation of the front ring gear 251 when the load of the power tool 100 is greater than a preset value, thereby allowing the power tool 100 to output different torques.

Figure 4:
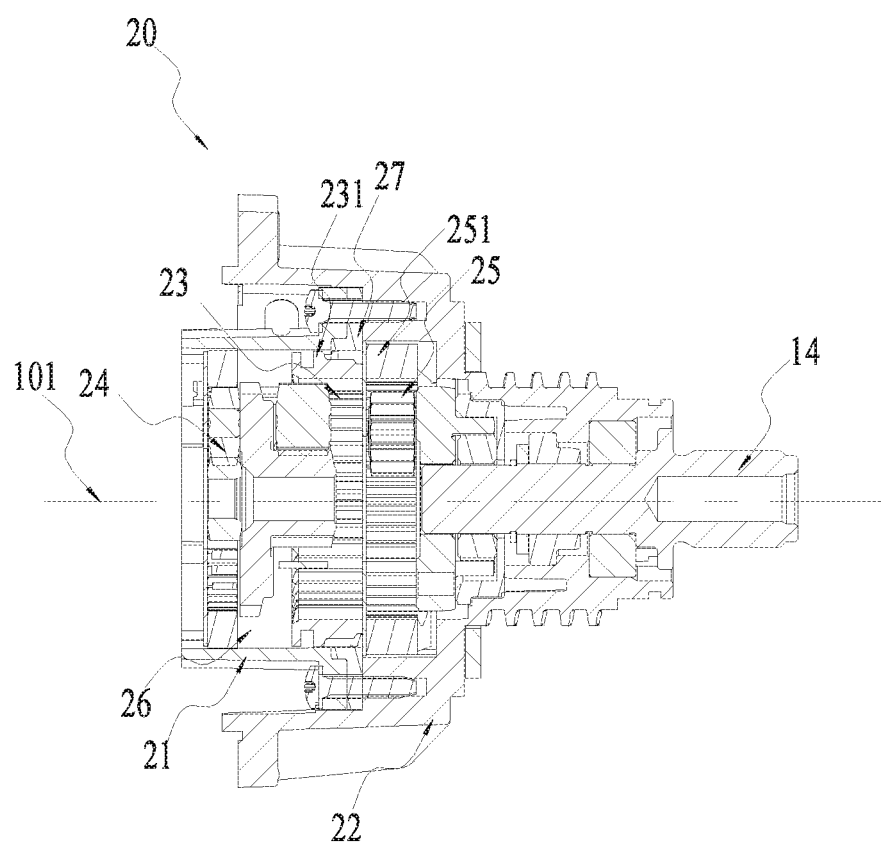
FIG. 4 is a sectional view of the gearbox assembly of FIG. 3.
Figure 5:
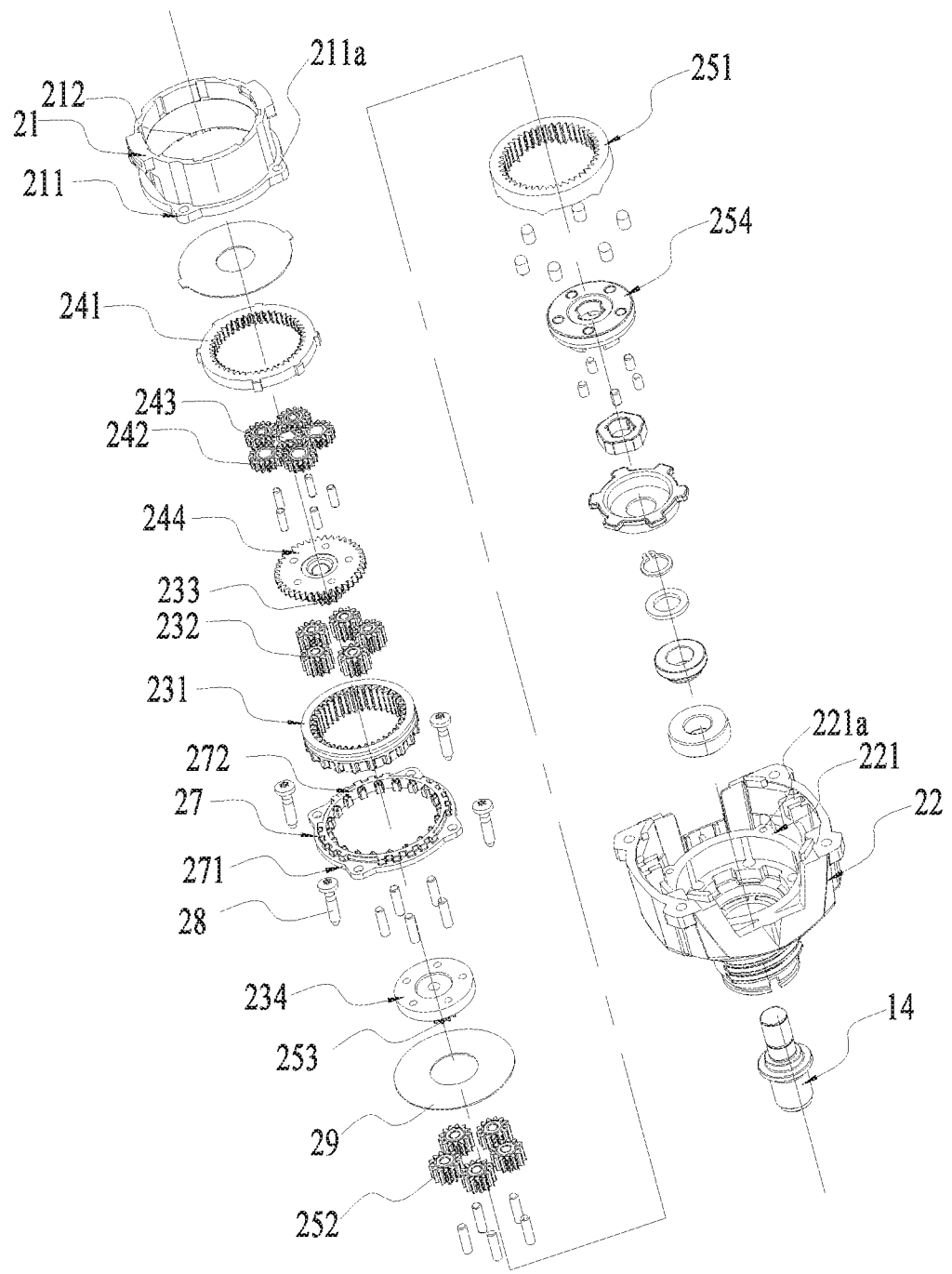
FIG. 5 is an exploded view of the gearbox assembly of FIG. 3.
Figure 6:
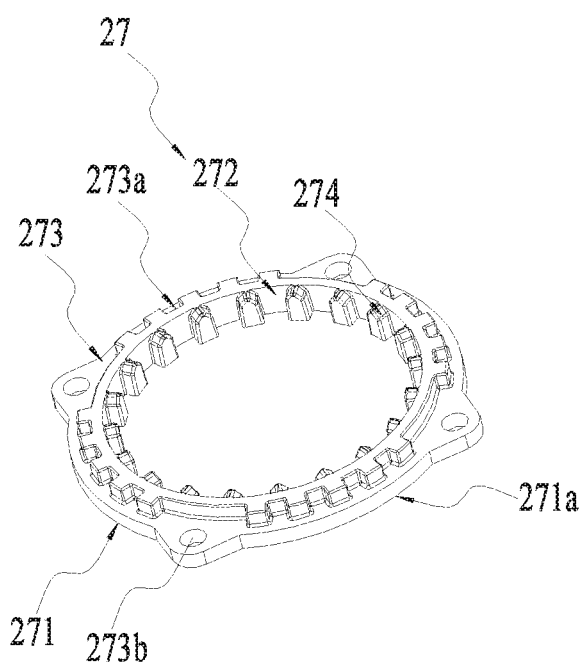
FIG. 6 is a perspective view of a limiting member of FIG. 3.
Figure 7:
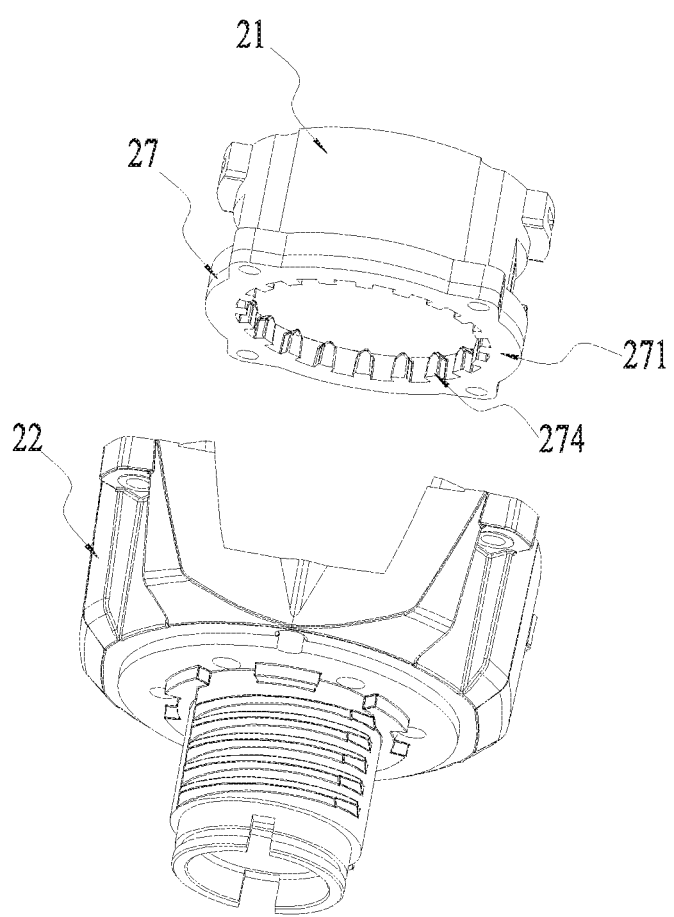
FIG. 7 is a perspective view of a first case, the limiting member and a second case of FIG. 3.

As illustrated in FIGS. 4 to 6, the gearbox assembly 20 further includes a limiting member 27. The limiting member 27 is provided with a limiting portion 271 for limiting an axial position of the front ring gear 251 so as to prevent gear skipping due to moving of the front ring gear 251 in the axial direction. In this embodiment, the first case 21 and the second case 22 are formed from a first material, the limiting member 27 is formed from a second material different from the first material, and the limiting member 27 is undetachably connected to the first case 21. In this way, when the power tool 100 is operating, torque exerted on the front ring gear 251 is transmitted to the limiting member 27, preventing the service life of the gearbox assembly 20 from being affected by the deformation of the first case 21 and thereby improving machine stability. Further, the second material preferably has a greater hardness than the first material. For example, the first material is aluminum and the second material is steel. In this way, the limiting member 27 will be more difficult to deform, preventing the front ring gear 251 from moving in the axial direction and thereby preventing gear skipping due to moving of the front ring gear 251 in the axial direction. It is to be noted that in this example, the undetachable connection of the limiting member 27 and the first case 21 means that the user cannot separate the first case body 21 and the limiting member 27 without destructive disassembly. For example, when two components are combined into one piece by welding or die-casting or the like, the two components are undetachably connected, while when two components are fixedly connected to each other by buckles or screws, the two components are detachably connected. For example, in this example, the limiting member 27 is undetachably connected to the first case 21 by serving as an insert, so the user cannot separate the limiting member 27 from the first case 21.

As illustrated in FIGS. 4 to 7, the first case 21 includes a first connecting portion 211, the second case 22 includes a second connecting portion 221. The first connecting portion 211 and the second connecting portion 221 are both connected to a connecting member 28, such that the first case 21 and the second case 22 are fixedly connected.

Specifically, as illustrated in FIGS. 4 to 7, the limiting member 27 is a ring member, and the limiting member 27 includes a ring portion 272 and an extension portion 273. The ring portion 272 may be centered on the first axis 101, and the inner ring of the ring portion 272 is provided with a locking portion 274 for locking the rotation of the ring gear 231 in the circumferential direction. Specifically, multiple first protrusions are formed on the outer circumference of the ring gear 231, and the locking portion 274 is a second protrusion that can protrude into a space formed between two adjacent first protrusions.

The extension portion 273 extends from the outer ring of the ring portion 272 outwards in the radial direction perpendicular to the first axis 101. At least a part of the extension portion 273 extends between the first connecting portion 211 and the second connecting portion 221 to space apart the first connecting portion 211 and the second connecting portion 221 in the axial direction. In the axial direction, a recess 273a that opens towards the first case 21 in a direction parallel to the first axis 101 is further formed on the side of the extension portion 273 close to the motor 12. Correspondingly, the first case 21 is provided with a protrusion 212 capable of being embedded in the recess 273a. In the axial direction, a side of the extension portion 273 away from the motor 12 serves as the above limiting portion 271 for limiting the axial position of the front ring gear 251. The limiting portion 271 is provided with a limiting surface 271a. The limiting surface 271a extends in a plane perpendicular to the first axis 101. A spacer 29 is disposed between the limiting surface 271a and the front ring gear 251.

In fact, for the user, the first case 21 and the limiting member 27 are an inseparable whole. For example, in this embodiment, the first case 21 and the limiting member 27 form an inseparable whole in the form that the limiting member 27 serves as an insert. During manufacture, the limiting member 27 may be formed by stamping, and then the first case 21 is formed by die-casting with the first case 21 and the limiting member 27 being formed into an inseparable whole.

The whole formed by the first case 21 and the limiting member 27 has a through hole running through the first connecting portion 211 and the extension portion 273. Specifically, the first connecting portion 211 is provided with a first connecting hole 211a extending in the direction parallel to the first axis 101, the second connecting portion 221 is provided with a second connecting hole 221a extending in the direction parallel to the first axis 101, and the extension portion 273 is provided with a communicating hole 273b communicating with both the first connecting hole 211a and the second connecting hole 221a. The connecting member 28 sequentially passes through the first connecting hole 211a and the communicating hole 273b and then extends into the second connecting hole 221a, so that the first case 21 and the second case 22 are secured to each other. The connecting member 28 may be a screw.

The above illustrates and describes basic principles, main features and advantages of the present disclosure. It is to be understood by those skilled in the art that the above examples do not limit the present disclosure in any form, and all solutions obtained by means of equivalent substitution or equivalent transformation fall within the protection scope of the present disclosure.

What is claimed is:
1. A power tool comprising:
a motor;
an output shaft configured to output torque when driven by the motor to rotate around a first axis; and
a gearbox assembly configured to transmit power between the motor and the output shaft;
wherein the gearbox assembly comprises a first case and a second case, the first case and the second case are configured to be coupled to each other to form an accommodating cavity, and the gearbox assembly further comprises:
a ring gear provided with internal teeth and rotatably disposed in the accommodating cavity;
a planet gear engaged with the ring gear;
a sun gear engaged with the planet gear; and
a front ring gear disposed on a side of the ring gear close to the output shaft, wherein the first case is made from a first material, the gearbox assembly further comprises a limiting member made from a second material different from the first material, the limiting member is provided with a locking portion for locking a rotation of the ring gear in a circumferential direction, and the limiting member and the first case are undetachably connected to each other, and wherein the limiting member is provided with a limiting portion for limiting an axial position of the front ring gear.

2. The power tool of claim 1, wherein the ring gear is axially movably disposed in the accommodating cavity.

3. The power tool of claim 1, wherein the limiting portion comprises a limiting surface extending in a plane perpendicular to the first axis, and the gearbox assembly further comprises a spacer disposed between the limiting surface and the front ring gear.

4. The power tool of claim 1, wherein the first case comprises a first connecting portion provided with a first connecting hole extending in a direction parallel to the first axis, the second case comprises a second connecting portion provided with a second connecting hole extending in the direction parallel to the first axis, the gearbox assembly further comprises a connecting member passing through the first connecting hole and extending into the second connecting hole, and at least a part of the limiting member is disposed between the first connecting portion and the second connecting portion to space apart the first connecting portion and the second connecting portion.

5. The power tool of claim 4, wherein the limiting member is provided with a communicating hole communicating with both the first connecting hole and the second connecting hole and the connecting member passes through the communicating hole.

6. The power tool of claim 1, wherein the limiting member comprises a ring portion, an inner ring of the ring portion is provided with the locking portion, an extension portion extends from the ring portion outwards in a radial direction perpendicular to the first axis, the extension portion is further provided with a recess opening towards the first case in a direction parallel to the first axis, and the first case is provided with a protrusion configured to be embedded in the recess.

7. The power tool of claim 6, wherein the first case comprises a first connecting portion provided with a first connecting hole extending in the direction parallel to the first axis, the second case comprises a second connecting portion provided with a second connecting hole extending in the direction parallel to the first axis, the gearbox assembly further comprises a connecting member passing through the first connecting hole and extending into the second connecting hole, at least a part of the extension portion extends between the first connecting portion and the second connecting portion to space apart the first connecting portion and the second connecting portion in the axial direction, and the extension portion is provided with a communicating hole communicating with both the first connecting hole and the second connecting hole.

8. The power tool of claim 1, wherein the second material has a greater hardness than the first material.

9. The power tool of claim 8, wherein the front ring gear is rotatably disposed in the accommodating cavity and the power tool further comprises a torque adjustment assembly configured to limit the rotation of the front ring gear in a circumferential direction when a load of the power tool is less than a preset value.

10. The power tool of claim 8, further comprising a clamping device configured to clamp a drilling bit, wherein the clamping device is mounted to the output shaft.

11. A power tool comprising:
a motor;
an output shaft configured to output torque when driven by the motor to rotate around a first axis; and
a gearbox assembly configured to transmit power between the motor and the output shaft;
wherein the gearbox assembly comprises a first case and a second case, the first case and the second case are configured to be coupled to each other to form an accommodating cavity, and the gearbox assembly further comprises:
a ring gear provided with internal teeth and rotatably disposed in the accommodating cavity;
a planet gear engaged with the ring gear;
a sun gear engaged with the planet gear; and
a front ring gear disposed in an axial direction and on a side of the ring gear close to the output shaft;
wherein the first case is made from a first material, the gearbox assembly further comprises a limiting member made from a second material different from the first material, the limiting member is provided with a locking portion for locking a rotation of the ring gear in a circumferential direction, and the limiting member and the first case are combined into one piece by die-casting, and
wherein the limiting member is provided with a limiting portion for limiting an axial position of the front ring gear.

12. The power tool of claim 11, wherein the limiting portion comprises a limiting surface extending in a plane perpendicular to the first axis, and the gearbox assembly further comprises a spacer disposed between the limiting surface and the front ring gear.

13. The power tool of claim 11, wherein the first case comprises a first connecting portion provided with a first connecting hole extending in a direction parallel to the first axis, the second case comprises a second connecting portion provided with a second connecting hole extending in the direction parallel to the first axis, the gearbox assembly further comprises a connecting member passing through the first connecting hole and extending into the second connecting hole, and at least a part of the limiting member is disposed between the first connecting portion and the second connecting portion to space apart the first connecting portion and the second connecting portion.

14. The power tool of claim 13, wherein the limiting member is provided with a communicating hole communicating with both the first connecting hole and the second connecting hole and the connecting member passes through the communicating hole.

15. The power tool of claim 11, wherein the limiting member comprises a ring portion, an inner ring of the ring portion is provided with the locking portion, an extension portion extends from the ring portion outwards in a radial direction perpendicular to the first axis, the extension portion is further provided with a recess opening towards the first case in a direction parallel to the first axis, and the first case is provided with a protrusion configured to be embedded in the recess.

16. The power tool of claim 11, wherein the second material has a greater hardness than the first material.

* * * * *